Figure 1:
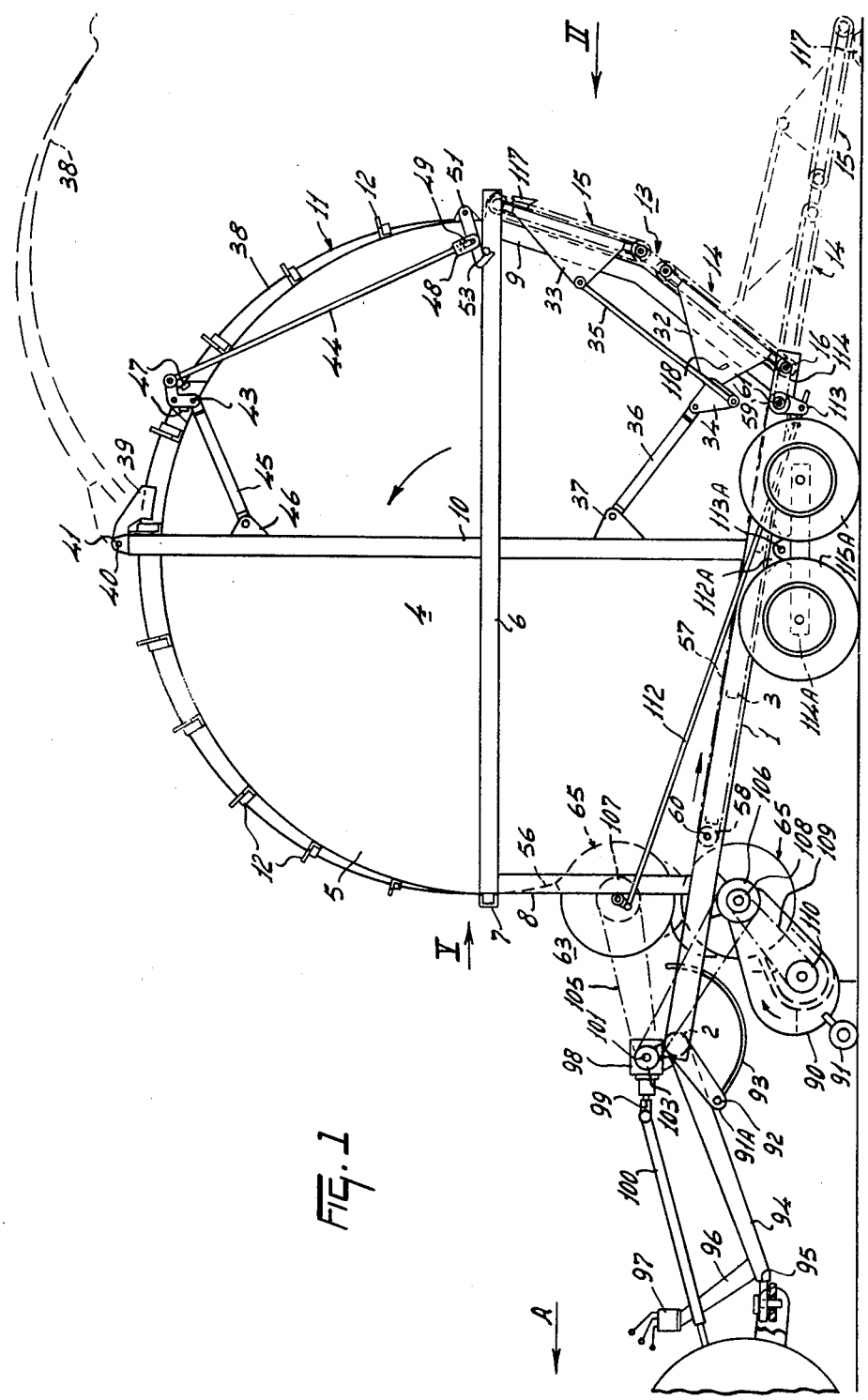

United States Patent [19]
Van der Lely

[11] 3,974,632
[45] Aug. 17, 1976

[54] COLLECTION OF CROP AND LIKE MATERIALS

[76] Inventor: Cornelis Van der Lely, 7 Bruschenrain, Zug, Switzerland

[22] Filed: Aug. 20, 1974

[21] Appl. No.: 499,047

[30] Foreign Application Priority Data
Aug. 24, 1973 Netherlands............... 7311670

[52] U.S. Cl.................... 56/341; 56/344; 56/361; 56/364; 56/DIG. 1
[51] Int. Cl.$^2$...................... A01D 87/00
[58] Field of Search............ 56/341, 343–364, 56/DIG. 1; 214/520, 522, 83.26; 100/88

[56] References Cited
UNITED STATES PATENTS

| | | | |
|---|---|---|---|
| 1,558,164 | 10/1925 | Haney | 214/522 |
| 2,644,292 | 7/1953 | Oberholtz | 56/344 |
| 3,411,274 | 11/1968 | Jarvis | 56/DIG. 1 |
| 3,665,690 | 5/1972 | Wenger | 56/341 |
| 3,679,074 | 7/1972 | Kuehl | 214/83.26 |
| 3,722,197 | 3/1973 | Vermeer | 56/341 |
| 3,837,159 | 9/1974 | Vermeer | 56/341 |

FOREIGN PATENTS OR APPLICATIONS

| | | | |
|---|---|---|---|
| 1,582,459 | 11/1967 | Germany | 56/364 |
| 1,198,111 | 8/1965 | Germany | 56/344 |
| 6,402,736 | 9/1965 | Netherlands | 56/364 |
| 6,507,569 | 7/1966 | Netherlands | 56/344 |
| 389,975 | 3/1965 | Switzerland | 56/364 |

*Primary Examiner*—Hugh R. Chamblee
*Assistant Examiner*—J.N. Eskovitz
*Attorney, Agent, or Firm*—Mason, Mason & Albright

[57] ABSTRACT

A crop collection vehicle can be coupled to a prime mover for movement over the ground to collect and move crop to a desired site. A pick up and feeding mechanism at the front of the vehicle feeds crop to a chamber that is defined by a forward wall, a rear wall, side walls and a top. The chamber is enlarged with its walls bulged outwardly and a conveyor system within the chamber is positioned to receive and move crop received from the mechanism towards the rear of the chamber. The conveyor system includes a floor conveyor that slopes downwardly to the rear and articulated conveyors that coextend upwardly with a portion of the rear wall. The latter portion can be tilted together with the articulated conveyors to a downwardly extending position so that crop received from the floor conveyor can be formed and discharged as a coherent mass of crop intact. The rear wall and top of the chamber can be tilted by hydraulic piston assemblies and the mechanism together with conveyor system can be driven from the p. t. o. of the prime mover. A feeding device formed by cooperating opposing drums with tines that are moved to active crop loading positions is located at an entrance of the chamber so that crop is fed from between the drums through the chamber entrance. Alternatively, the feeding device can be reciprocating tine supports that progressively feed crop from a pick up to the floor conveyor. The conveyors of the system can be driven intermittently from a drive connection between the feeding device and the floor conveyor.

25 Claims, 15 Drawing Figures

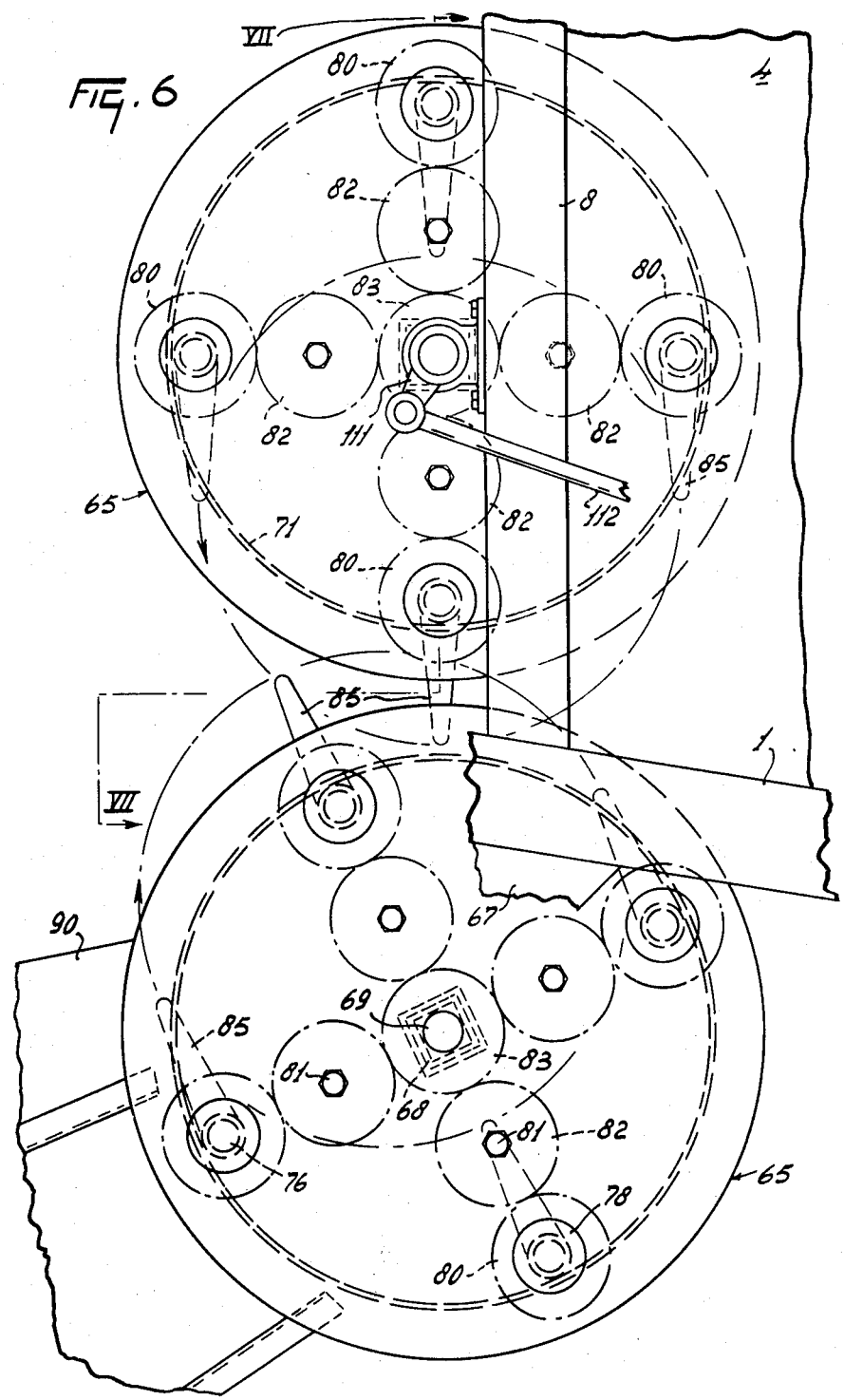

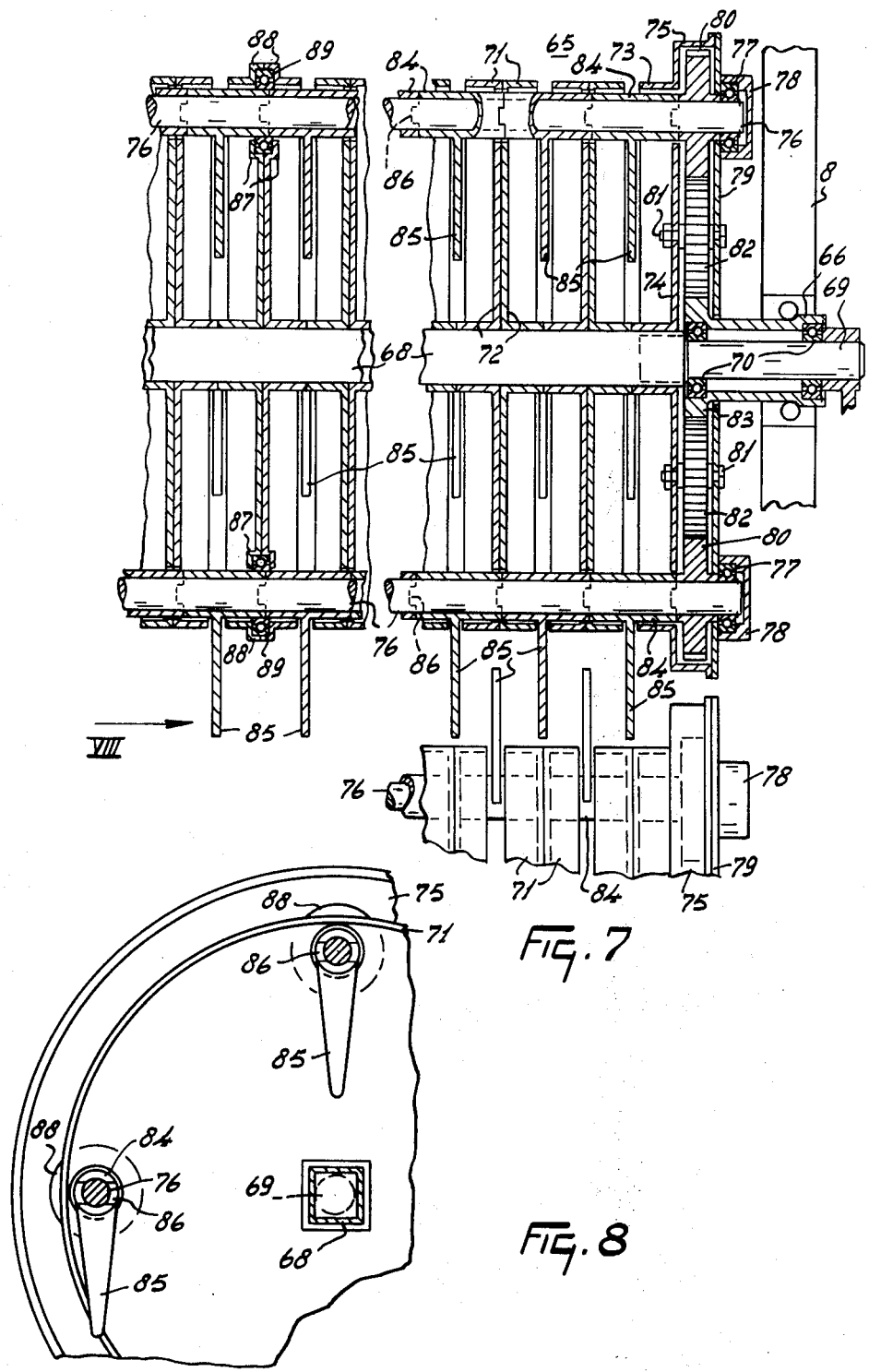

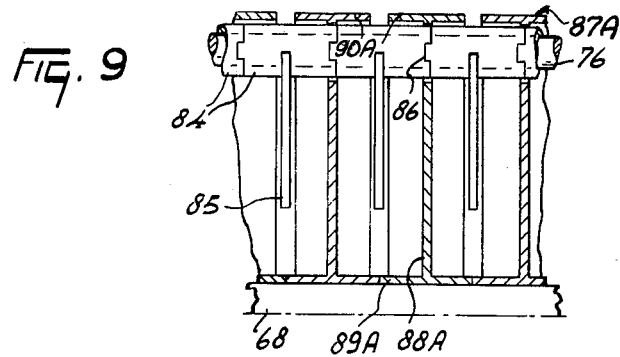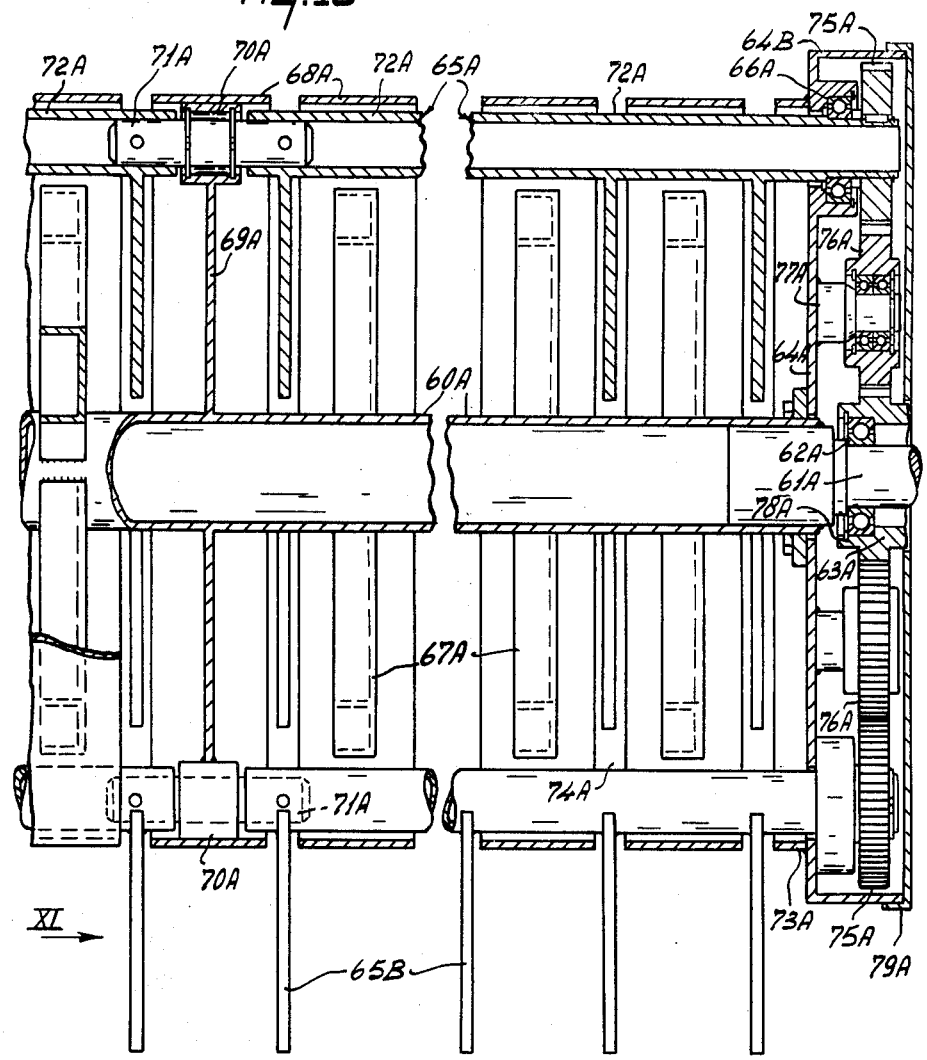

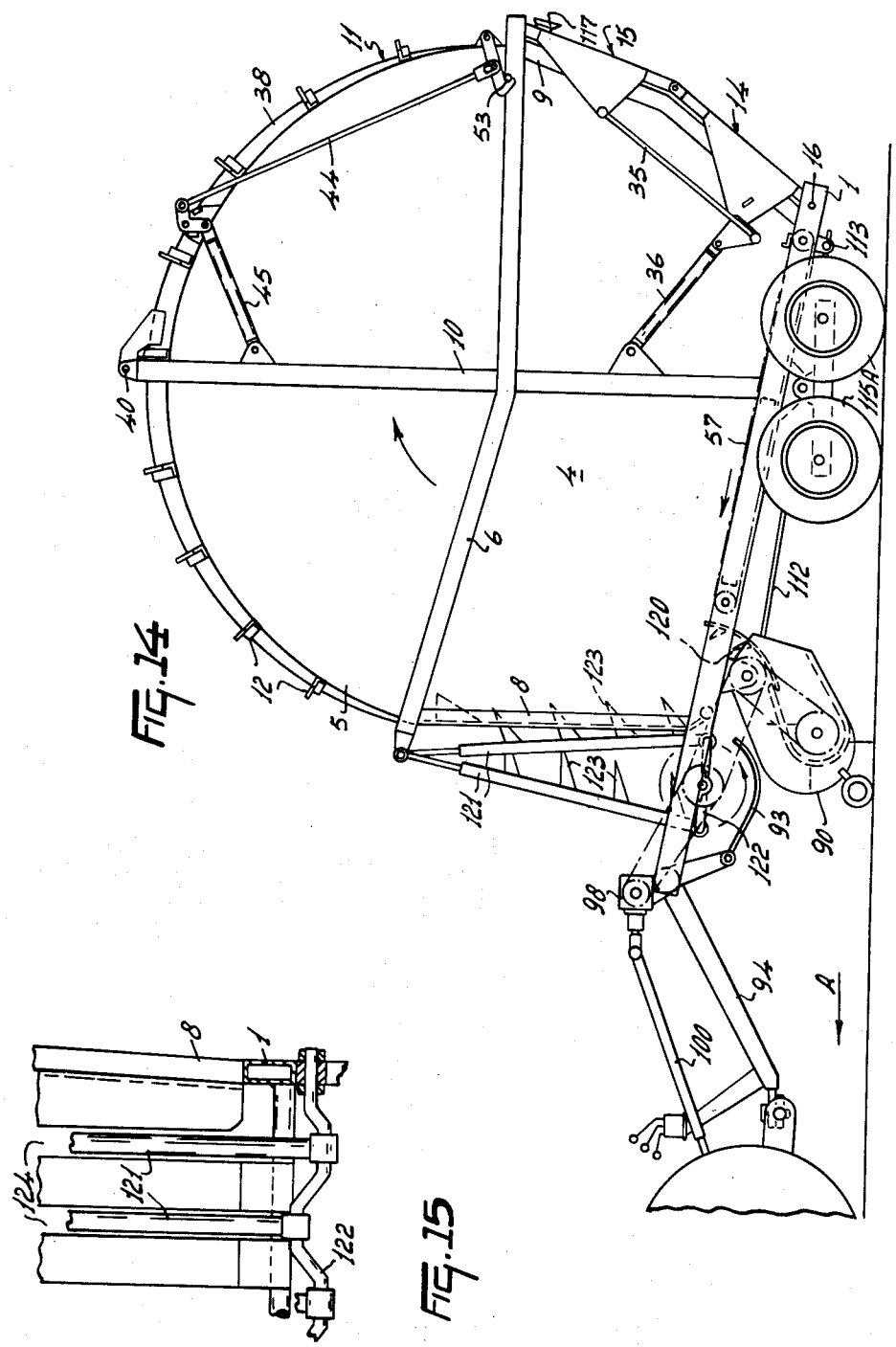

COLLECTION OF CROP AND LIKE MATERIALS

Figure 2:
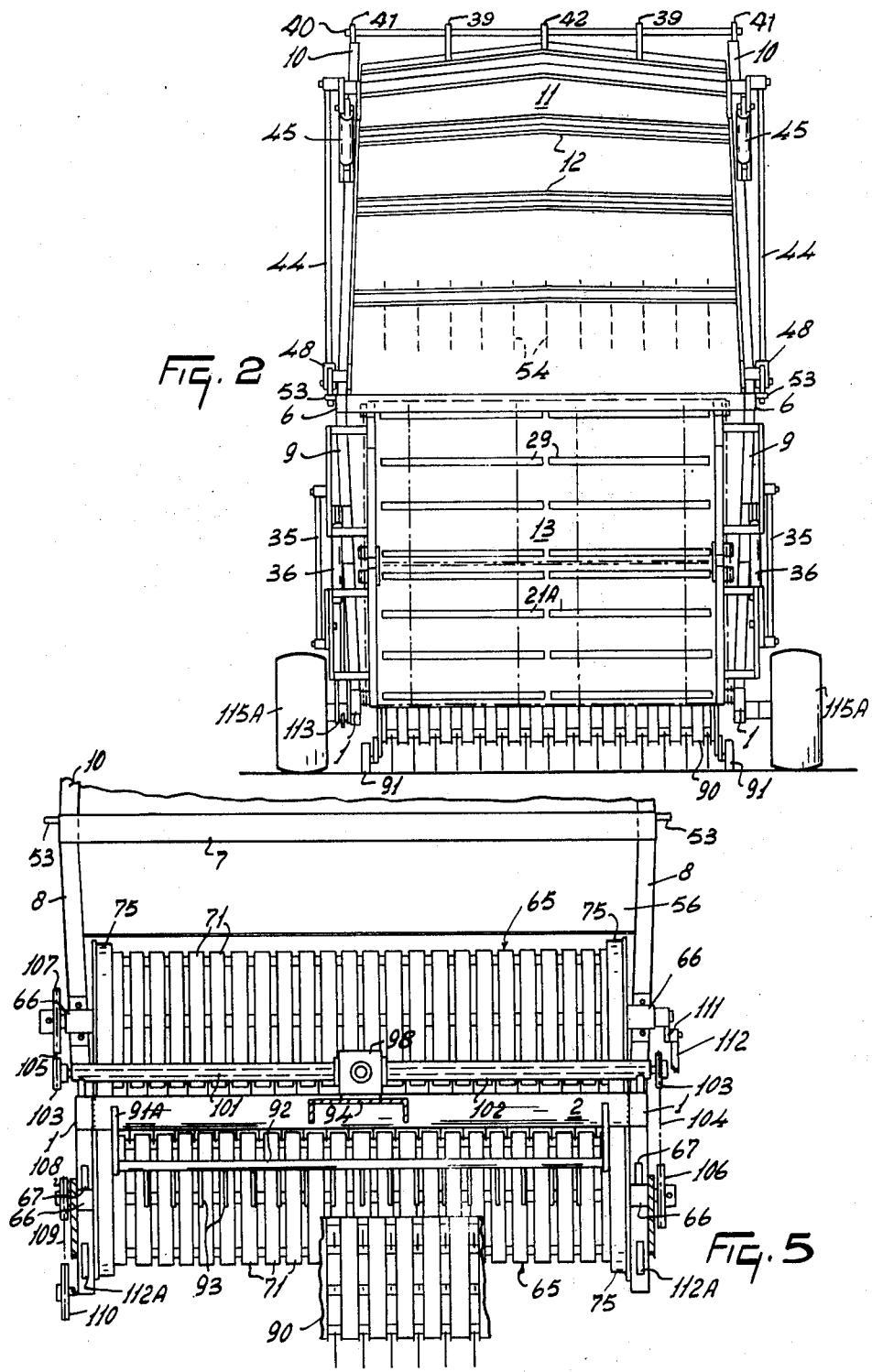
Figure 3:
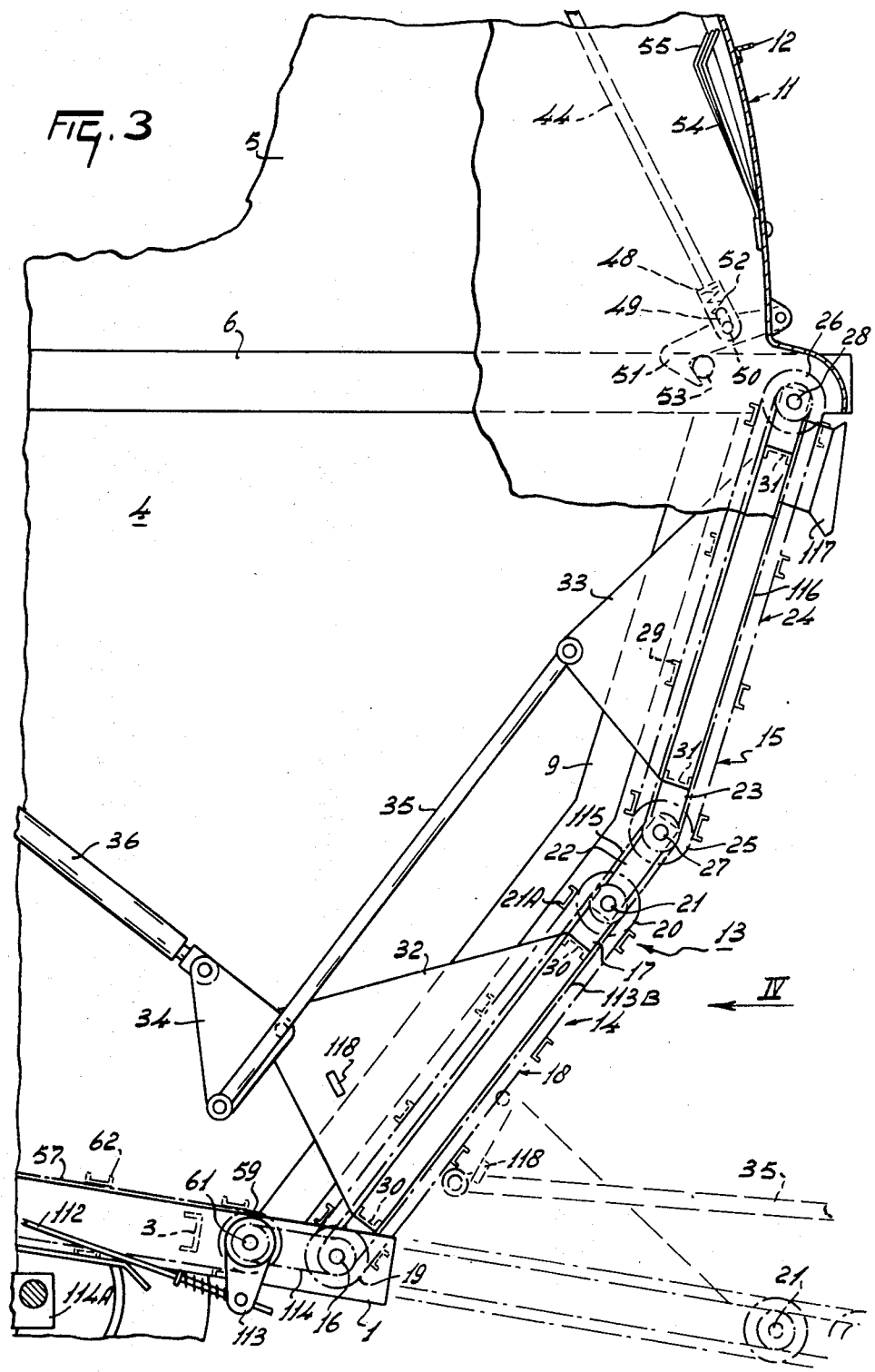
Figure 4:
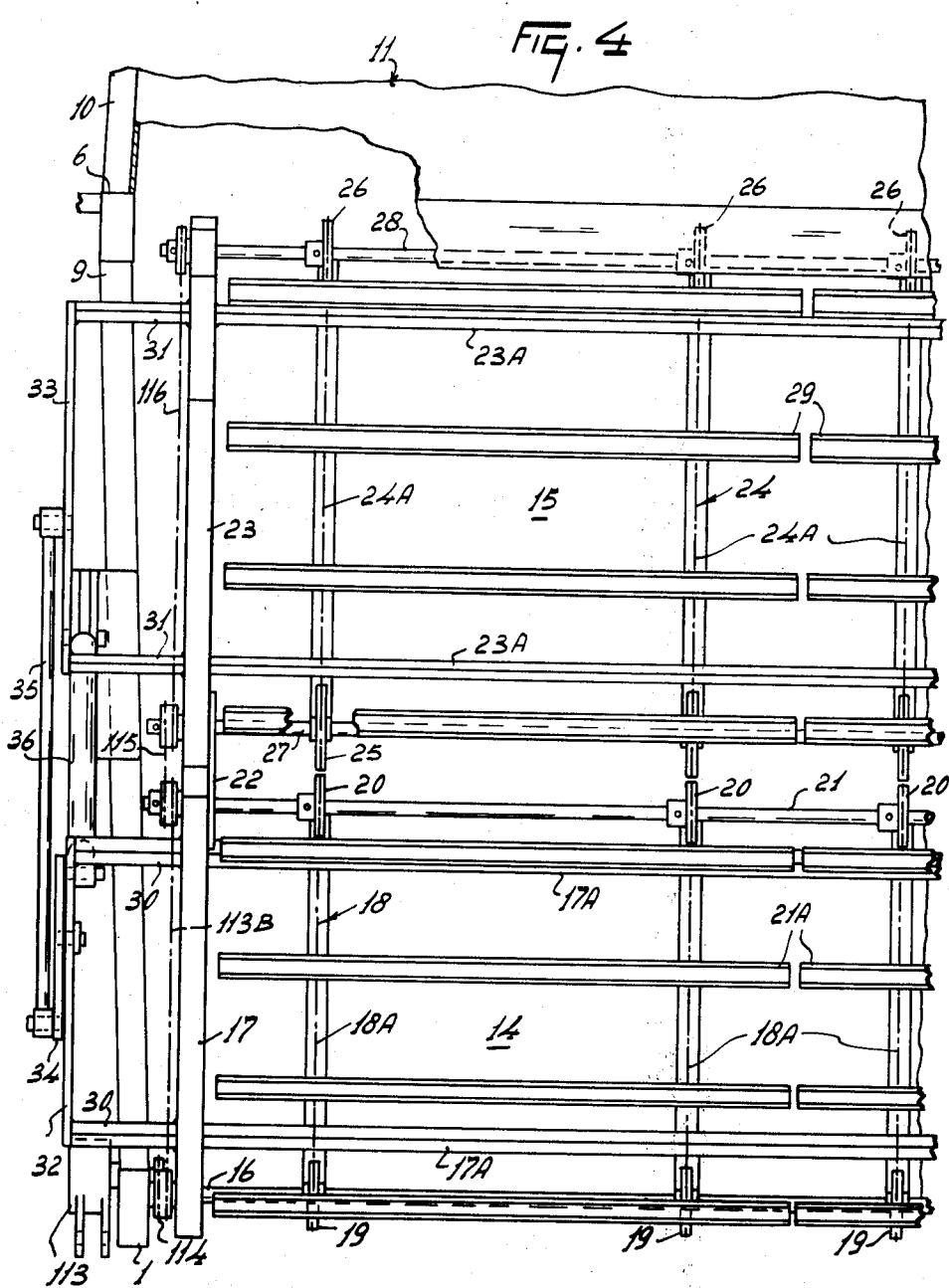
Figure 11:
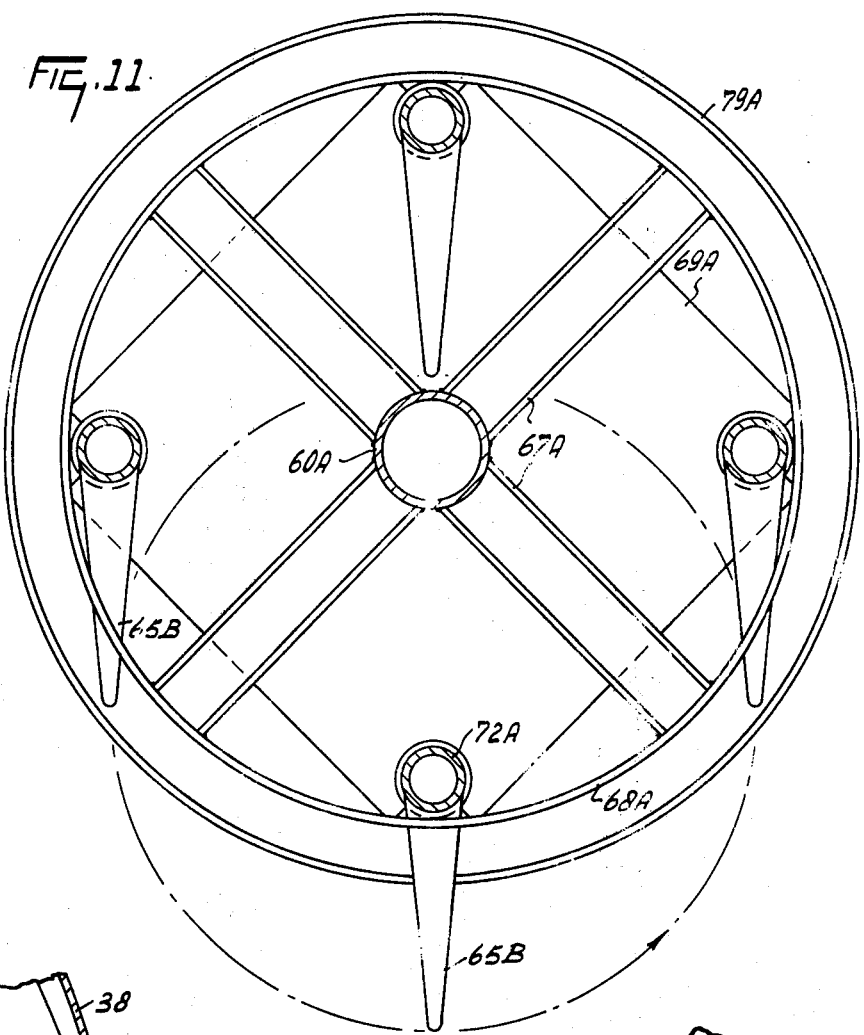
Figure 12:
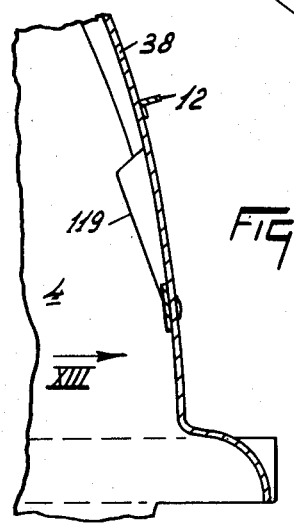
Figure 13:
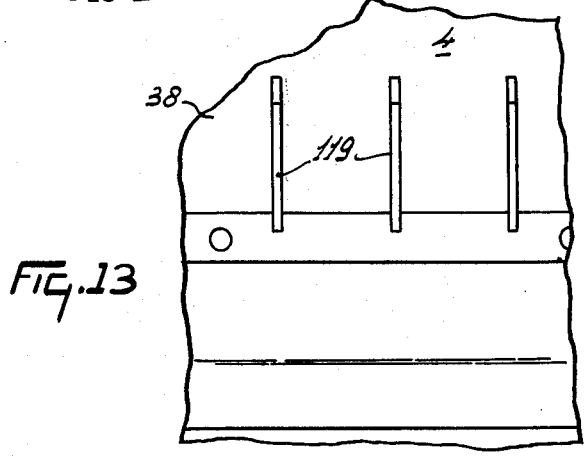

For a better understanding of the invention, and to show how the same may be carried into effect, reference will now be made, by way of example, to the accompanying drawings, in which:

FIG. 1 is a side elevation of an implement or vehicle in accordance with the invention connected to the rear of an agricultural tractor or other towing and operating vehicle, FIG. 2 is a rear elevation as seen in the direction indicated by an arrow II in FIG. 1, FIG. 3 is a part-sectional side elevation illustrating the construction and arrangement of parts that can be seen to the right-hand side of FIG. 1 to an enlarged scale and in greater detail, FIG. 4 is a rear elevation as seen in the direction indicated by an arrow IV in FIG. 3, FIG. 5 is a front elevation as seen in the direction indicated by an arrow V in FIG. 1, FIG. 6 is a side elevation, to an enlarged scale, illustrating the construction and arrangement of rotary drums of a feeding mechanism of the implement or vehicle in greater detail, FIG. 7 is a section taken on the line VII—VII in FIG. 6, FIG. 8 is a view as seen in the direction indicated by an arrow VIII in FIG. 7, FIG. 9 is a similar view to FIG. 7 but illustrates an alternative construction, FIG. 10 is again a similar view to FIG. 7 but illustrates a further alternative construction, FIG. 11 is a view as seen in the direction indicated by an arrow XI in FIG. 10, FIG. 12 is a scrap side elevation, to an enlarged scale, illustrating parts disposed in the region of a junction between a top wall and a rear wall of a load-receiving chamber of the implement or vehicle in greater detail, FIG. 13 is a view as seen in the direction indicated by an arrow XIII in FIG. 12, FIG. 14 is a similar view to FIG. 1 and illustrates an alternative embodiment of an implement or vehicle in accordance with the invention, and FIG. 15 is a scrap elevation, to an enlarged scale, as seen in the direction indicated by an arrow XV in FIG. 14.

Referring to FIGS. 1 to 8 of the drawings, the crop pick-up or collection implement or vehicle that is illustrated will hereinafter, in this description, be referred to merely as a "vehicle" for the sake of brevity. The vehicle has a frame that includes two beams 1 that extend substantially parallel to one another and approximately, but not exactly, parallel to the intended direction of operative travel of the vehicle which is indicated by an arrow A in FIG. 1 of the drawings. The two beams 1 are interconnected at their leading ends by a transverse tie beam 2 of circular cross-section. Considered forwardly from the rearmost ends of the two beams 1, they are also transversely interconnected, over two-thirds of their lengths, by regularly spaced apart beams 3 of channel-shaped cross-section that form supports for a load-receiving floor of a load-receiving chamber 4 of the vehicle. The chamber 4 is defined not only by its floor but also by two upright longitudinally extending side walls 5 which side walls 5 are so shaped that, as can be seen best in FIGS. 2 and 5 of the drawings, they are spaced apart from one another by a greater distance at a level substantially midway between the top and the bottom of the vehicle than they are in the regions of said top and bottom. Substantially horizontally disposed and longitudinally extending supporting beams 6 hold the side walls 5 in their appointed positions at the level of maximum spacing between the side walls. The leading ends of the supporting beams 6 with respect to the direction A are transversely interconnected by a tie beam 7 and upright beams 8 rigidly connect the two junctions between the supporting beams 6 and the tie beam 7 to the corresponding underlying frame beams 1. Locations close to the rearmost ends of the supporting beams 6 with respect to the direction A are rigidly connected by downwardly directed beams 9 to locations close to the rearmost ends of the corresponding two frame beams 1. However, it will be seen from the drawings that the beams 9 are not of rectilinear configuration but have angular bends near their midpoints so that large obtuse angles are enclosed at the bends, the bends being directed outwardly, rather than inwardly, towards the center of the chamber 4. The arrangement is, in fact, such that, as seen in side elevation, the beams 9 contribute to a generally curved configuration of the rear of the chamber 4. Two upright supporting beams 10 extend from the corresponding frame beams 1 to cross the substantially horizontal supporting beams 6 and terminate, at their upper ends, just above the upper edge of the side walls 5. The supporting beams 6 and 10 are secured to one another at the locations at which they are in crossed relationship.

The chamber 4 has a top 11 which is of substantially semicircular configuration when seen in side elevation, (FIG. 1) and which extends between the upper edges of the two side walls 5. The top 11 is formed with an outwardly directed bulge that is of minimum magnitude at the foremost and rearmost extremities of said top and maximum magnitude in the uppermost region thereof. This configuration will be apparent from a study of FIGS. 1 and 2, in particular of the drawings. The configuration of the top 11 is sustained by a plurality of regularly spaced apart transverse beams 12 of L-shaped cross-section, said beams 12 being bent along their lengths to match the bulge of the top 11 that has been discussed above. The transverse beams 12 are, of course, located on the outer surface of the top 11 with respect to the center of the chamber 4 to avoid impeding movement of crop contained within the chamber 4 in any way.

The chamber 4 has a rear wall 13 that is arranged pivotaly between the rearmost ends of the frame beams 1, the axis about which pivotal displacement can be made extending substantially horizontally perpendicular to the direction A. Moreover, the rear wall 13 comprises a lower portion 14 and an upper portion 15 which portions are themselves pivotable relative to one another. This construction can be seen best in FIGS. 3 and 4 of the drawings from which it will be noted that the lower portion 14 of the wall 13 comprises two side beams 17 that are pivotally mounted between the beams 1 with the aid of a substantially horizontal shaft 16 extending between said beams 1 and defining the axis that has been referred to above. The two side beams 17 are perpendicularly and rigidly interconnected, between their ends, by transverse beams 17A (FIG. 4) and plates are carried by the beams 17 and 17A for co-operation with one run of an endless conveyor 18 in a manner that is know per se. The endless conveyor 18 comprises four transversely spaced chains 18A that are passed around sprocket wheels 19 mounted on the shaft 16 in a freely rotatable manner and also around sprocket wheels 20 fixedly secured to a shaft 21 is parallel to the shaft 16. The shaft 16 extends between the ends of the beams 17 that are normally lowermost and the shaft 21 extends between the ends thereof that are normally uppermost. The four chains 18A of the conveyor 18 are transversely interconnected at regular intervals along their lengths by bars or beams 21A (FIG. 4) of channelshaped cross-section, said bars or beams 21A being arranged so that the limbs of their channels project outwardly away from the chains 18A to which the bases thereof are secured. This arrangement is known per se and it will be noted from FIG. 4 of the drawings that, in fact, each individual bar or beam 21A is only connected to two of the chains 18A, said bars or beams being disposed in substantially transversely registering pairs that are not directly interconnected.

Strips 22 are turnable about the opposite ends of the shaft 21 to connect the top of the lower rear wall portion 14 to the bottom of the upper rear wall portion 15. When it is in the position shown in full lines in the drawings, the rear wall 13 has the top of its upper portion 15 located at substantially the same horizontal level as the two supporting beams 6 of the side walls 5 of the chamber 4. The ends of the strips 22 that are remote from the shaft 21 are interconnected by a shaft 27 that is parallel to the shafts 16 and 21. The upper portion 15 of the rear wall 13 is basically similar to the lower portion 14 and comprises two side beams 23, transverse beams 23A rigidly interconnecting said side beams 23, plates fastened to said beams 23 and 23A for co-operation with one run of an endless conveyor 24, four endless conveyor chains 24A, four sprocket wheels 25 freely rotatably mounted on the shafts 27 and four sprocket wheels 26 rigidly secured to a further parallel shaft 28 rotatably mounted between the ends of the side beams 23 that are normally uppermost. As in the case of the previously described conveyor 18, the chains 24A are, of course, arranged around corresponding pairs of the sprocket wheels 25 and 26. Pairs of the conveyor chains 24A are interconnected at regular intervals by bars or beams 29 that are similar in construction and arrangement to the previously described bars or beams 21A. The strips 22 which interconnect the lower and upper portions 14 and 15 of the rear wall 13 are pivotable about the shaft 27.

Pairs of supports 30 and 31 project laterally beyond the beams 17 and 23 of the two rear wall portions 14 and 15 at both sides of the vehicle, the free outermost ends of said pairs of supports being provided with vertically disposed and generally triangular plates 32 and 33 respectively. The lower plates 32 are substantially parallel to the lower portions of the corresponding side walls 5. Each plate 32 has a triangular rocker 34 pivotally connected to it, the pivotal connection being located at one corner of said rocker. A further corner of the rocker 34 is pivotally linked by a connecting rod 35 to the corresponding plate 33 at the same side of the vehicle. The remaining third corner of the rocker 34 is pivotally connected to the free end of the piston rod of a hydraulic piston and cylinder assembly 36 whose cylinder is pivotally mounted on a lug 37 (FIG. 1) carried by the upright supporting beam 10 at the corresponding side of the vehicle.

The top 11 of the chamber 4 includes a tiltable portion 38 which, as will be apparent from FIG. 1, is substantially the rear half of said top 11 with respect to the direction A. The tiltable portion 38 is connected by brackets 39 (FIGS. 1 and 2) to a substantially horizontal transverse shaft 40 pivotally mounted in lugs 41 carried at the uppermost ends of the upright supporting beams 10 and in a lug 42 mounted centrally of the uppermost transverse beam 12 of the top 11. Bell-crank levers or rockers 43 are pivotally mounted on brackets carried by the opposite lateral sides of the tiltable portion 38 of the top 11 at a distance from the shaft 40, one arm of each lever or rocker 43 being pivotally linked to one end of a connecting rod 44 while the other arm thereof is pivotally connected to the free end of the piston rod of a hydraulic piston and cylinder assembly 45 whose cylinder, in turn, is pivotally connected to a lug 46 secured to the upright supporting beam 10 at the same side of the vehicle and towards the upper end of that beam. The arm of each lever or rocker 43 that co-operates pivotally with the corresponding assembly 45 is movable angularly between two stops 47 on the corresponding mounting bracket carried by the tiltable portion 38. The end of each coupling rod 44 that is remote from the lever or rocker 43 carries a corresponding fork 48 whose limbs are formed with longitudinally extending slots 49 (FIG. 3) through which a transverse pin 50 is entered. A locking hook or latch 51 is pivotable about each pin 50 between the limbs of the corresponding fork 48 and it will be seen from FIG. 3 of the drawings that a compression spring 52 is located between the limbs of each fork 48 so as to bear between the base thereof and the corresponding hook or latch 51 in such a manner as to urge the corresponding pin 50 towards the end of the slots 49 that are remote from the base of the fork. Each hook or latch 51 has its plain end pivotally connected to the tiltable portion 38 at a corresponding lateral side thereof whereas its hooked end is arranged to co-operate with a retaining pin 53 carried by the corresponding substantially horizontal supporting beam 6. When the hook or latches 51 are engaged with the pins 53, the tiltable portion 38 of the top 11 is positively retained in the position thereof that is shown in full lines in FIG. 1 of the drawings.

That edge of the tiltable portion 38 that is rearmost and normally lowermost is shaped to define a shroud to screen off the members at the top of the upper portion 15 of the rear wall 13 of the chamber 4. Moreover, in a region of the inner concave side of said portion 38 that is located just above said shroud, a row of resilient tines 54 is provided, each tine 54 being inclined upwardly, and forwardly to a small extent with reference to the direction A, into the interior of the chamber from its fastening point. Uppermost free end regions 55 of the tines 54 are bent over back towards the curved wall of the top 11. As can be seen from FIGS. 2 and 3 of the drawings, the tines 54 are disposed in groups that may, for example, comprise three tines, the groups being regularly spaced apart from one another across the width of the tiltable portion 38.

The chamber 4 is provided with a front wall 56 that is disposed between the beams 8 beneath the tie beam 7 and the leading ends of the substantially horizontal supporting beams 6. The upper edge of the front wall 56 joins the lower edge of the top 11 and, as can be seen in broken lines in FIG. 1, prolongs the substantially circular cylindrical configuration of a major portion of the chamber 4. The lowermost edge of the front wall 56 is located at the level above that of the floor of the chamber 4, said floor being furnished on its upper surface with the upper run of an endless conveyor 57 which comprises four regularly spaced apart chains guided around sprocket wheels 58 and 59 carried by shafts 60 and 61 respectively. The shafts 60 and 61 are substantially horizontally disposed and are rotatably mounted between the two frame beams 1. The shaft 60 is located foremost with respect to the direction A at a location near to the front of the chamber 4 while the rear shaft 61 (FIGS. 1 and 3 of the drawings) is located a short distance forwardly from the rearmost ends of said beams 1. The endless conveyor 57 is basically similar to the two endless conveyors 18 and 24 that have already been described and comprises a plurality of regularly spaced apart bars or beams 62 that substantially perpendicularly interconnect pairs of the four chains of the conveyor 57.

A feeding or pushing mechanism that is generally indicated by the reference 63 is located just in front, with respect to the direction A, of an entrance to the chamber 4 that is defined between the lowermost edge of its front wall 56 and the front floor. The mechanism 63 comprises two drums 65 that are located one above the other with each of them rotatable about a corresponding substantially horizontal axis that is substantially perpendicular to the direction A. The opposite ends of a central axial shaft of the upper drum 65 are received in substantially horizontal bearings 66 (FIG. 5) carried by the upright beams 8 whereas the opposite ends of a corresponding axial shaft of the lower drum 65 are received in substantially horizontal bearings 66 carried by lugs 67 depending from the two frame beams 1. The two drums 65 are substantially identical and their previously mentioned axially extending central shafts, which are indicated by the references 68 (FIGS. 7 and 8), are of a polygonal cross-section which it is preferred, but is not essential, should be a square one. The bearings 66, which are in the form of bushes, accommodate ball bearings 70 that co-operate with circular cross-section stub shafts 69 projecting from the opposite ends of the tubular shafts 68. Each central shaft or support 68 is provided with a plurality of circular elements 71 that are slid axially onto the shaft. Each element 71 is afforded principally by a flange 72 having perpendicularly bentover inner and outer rims, the inner rims surround openings through which the corresponding axial shaft 68 is entered being of larger size than the outer rims. The various elements 71 are slid onto each shaft 68 in such a way that the free edges of the rims of successive elements face one another. Thus, by virtue of the reduced size of the outer rims as compared with the inner rims, the outer surface or sheath of each drum 65 that is principally afforded by said rims is formed with a plurality of unbroken slots between the elements 71. Near to the opposite ends of the central support or shaft 68 of each drum 65, elements 73 are provided of annular configuration, said elements 73 being afforded principally by flanges 74 formed at the inner circumference with a larger rim and at the outer circumference with a smaller rim. These rims, once again, are arranged with their free edges facing those of the rims of the neighbouring elements 71. However, each element 73 also includes a collar 75.

Close to their outer circumferential rims, the elements 71 and 73 are formed at 90° intervals around their centers with holes for the reception of four supports 76 that extend parallel to the corresponding central shaft 68. The opposite ends of the support 76 are received in ball bearings 77 located in protective housing 78 carried by plates 79 which plates, together with the flanges 74 and collars 75 of the elements 73, constitute casings in which toothed pinions 80 are secured to one end of each support 76. The plates 79 are connected to the flanges 74 of the elements 73 by transverse bolts 81 which bolts have shanks that also serve as pivotal shafts about which further toothed pinions 82 are freely rotatable. The pinions 82 are also disposed within the protective casings which have just been mentioned and their teeth are in mesh with those of corresponding ones of the pinions 80 and the teeth of a central pinion 83 that is integral with the corresponding bearing bush 66. Bushes or sleeves 84 are slid lengthwise along the supports 76, each bush or sleeve 84 carrying a corresponding substantially centrally mounted tine 85 so that, when the assembly is complete, the tines 85 are disposed in the slots between the outer rims of the elements 71 and 73. It can be seen in FIG. 6 of the drawings that the bushes or sleeves 84 are secured in place relative to the pinions 80 and relative to one another by projections 86 at one end of each bush or sleeve and matching recesses at the opposite end thereof. These projections 86 and matching recesses co-operate for the purpose just mentioned. In a central region of each drum 75, the flanges 72 of two neighbouring elements 71 are provided near their outer extremities with small collars 87 and 88 that co-operate to form housings for ball bearings 89 for turnably supporting central regions of the corresponding supports 76 and their surrounding bushes or sleeves 84. The drums 65 that have been described can be assembled in a simple manner from components most of which are easily manufactured by press-forming metal sheets. The bushes or sleeves 84 and the tines 85 which they carry are merely slid into position along the corresponding supports 76 and each drum 65 can be completely formed without the use of welding or a similar technique.

It will be seen from FIGS. 5 to 8 of the drawings that, during one revolution of each drum 65, the tines 85 thereof alternately project through the slotted outer surface of the drum and project inwardly towards the corresponding central shaft 68. This is, of course, true of each of the four rows of tines 85 of each drum 65 and is brought about as a result of the gear transmission between each central pinion 83 and the corresponding pinions 80 at the ends of the supports 76. The construction and arrangement is such that the two drums 65 rotate in opposite directions as indicated by arrows in FIG. 6 of the drawings and such that, in the lower drum 65, the tines 85 will project outwardly to their maximum extent in an uppermost region of that drum while, conversely, in the upper drum 65, the tines 85 will project outwardly therefrom to their maximum extent in a lowermost region of that drum. Again, as will be evident from FIG. 6, the tines 85 of the lower drum will be fully withdrawn when they are in a lower region of that drum and the tines 85 of the upper drum will be fully withdrawn when they are in an upper region of that drum. The paths described by the tips of the tines 85 of the two drums overlap one another as is indicated by broken line circles in FIG. 6 of the drawings and this is possible because, as will be noted from FIG. 5, the tines 85 corresponding to the two drums 65 are laterally staggered apart.

FIG. 9 of the drawings illustrates an alternative drum construction in which annular elements 87A are afforded principally by flanges 88A having inner rims 98A that project in both directions from the flanges 88A thus co-operating to form a sleeve which will slidably surround the central shaft 68. The elements 87A have similar rims 90A at their outer circumference but these rims are of smaller projecting extent than the inner rims 98A so that the required slots for the tines 85 are formed between them. As will be evident from FIG. 9, the construction and arrangement of the support 76, bushes or sleeves 84 and their projections 86 and matching recesses is similar to the construction that has already been described above.

FIGS. 10 and 11 of the drawings illustrate a further alternative drum construction in which a central shaft or support 60A has stub shafts 61A at its opposite ends, said stub shafts 61A being journalled by ball bearings 62A in non-rotary bearing bushes 63A. A large flange 64A is secured to each end of the central shaft or support 60A near to the corresponding stub shaft 61A, each flange 64A being formed at its outer circumference with a perpendicularly bent-over rim 64B. Near their outer circumferences, the flanges 64A are formed with holes at 90° intervals around the centers of the flanges, said holes receiving four corresponding supports 65A that extend parallel to the central shaft or support 60A. At their ends, the tine supports 65A are rotatably mounted in ball bearings 66A carried by housings integral with the flanges 64A. Circular elements or rings 68A are connected to the central shaft or support 60A between the flanges 64A by corresponding sets of four spokes 67A arranged in cruciform relationship (see FIG. 11). However, at the center of the drum, one circular element or ring 68A is arranged around the central shaft or support 60A with the aid of a generally square plate 69A. Each of the four corners of the plate 69A carries a corresponding bearing 70A and each bearing 70A receives a corresponding stub shaft 71A that projects axially from both ends of the bearing. Each of the tine supports 65A is in two separate but coaxial portions 72A and it will be evident from FIG. 10 of the drawings that those portions are interconnected at their neighbouring ends by the stub shafts 71A. The rings 68A are arranged relative to one another and relative to rings 73A carried by the flanges 64A in such a way that annular slots 74A are formed at the circumference of the drum, between the rings 68A, tines 65B that are secured to the portions 72A of the supports 65A being arranged so as alternately to project, and not to project, through said slots 74A. To this end, toothed pinions 75A are carried at the ends of the supports 65A, beyond the bearings 66A, and their teeth are in mesh with those idler pinions 76A that are rotatable about stub shafts 77A, carried by the flanges 64A, with the aid of ball bearings. The teeth of the four idler pinions 76A are in mesh with those of a pinion 78A carried by the bearing bush 63A at one end of the central shaft or support 60A. Although the construction described with reference to FIGS. 10 and 11 of the drawings is different to the constructions previously described, the operation is substantially identical and it is therefore unnecessary to repeat a description of that operation. It will be noted that the gear transmission between the pinion 78A and the pinions 75A is enclosed in a protective casing afforded by the corresponding flange 64A and its rim 64B and a co-operating cover plate 79A.

A pick-up mechanism 90 that is of a construction which is basically known per se is arranged near the front of the vehicle with respect to the direction A. Two supports 91A (FIG. 5) project downwardly and forwardly with respect to the direction A from the transverse tie beam 2 at the leading ends of the frame beams 1 and a transverse supporting rod 92 interconnects the foremost and lowermost ends of the supports 91A so as to extend parallel to the beam 2. A plurality of curved bars 93 have their ends secured to the rod 92 at regular intervals along the length thereof, said bars 93 being directed rearwardly with respect to the direction A from the rod 92 in such a way that their free ends are orientated upwardly (see FIG. 1). A central region of the tie beam 2 has a draw bar 94 connected to it in such a way that said draw bar 94 is directed downwardly, and forwardly with respect to the direction A, from said beam 2. The leading end of the draw bar 94 is provided with a substantially horizontally disposed towing eye 95 or an equivalent towing member. A support bracket 96 is mounted on the draw bar 94 close to the eye 95 and its upper end carries a control console 97 exhibiting a plurality of hydraulic controls for various hydraulically operated moving and/or movable parts of the vehicle. The control console 97 forms part of the hydraulic system of the vehicle and, in a basically known manner that is not illustrated in the drawings, this system can be placed in connection with the hydraulic system of the agricultural tractor or other vehicle which tows and operates the vehicle which is being described.

A gear box 98 (FIGS. 1 and 5) is mounted centrally on top of the transverse tie beam 2 and a rotary input shaft 99 projects forwardly therefrom in substantially the direction A. The leading splined or otherwise keyed end of the rotary input shaft 99 is arranged to be placed in driven connection with the power take-off shaft of the operating tractor or other vehicle by way of an intermediate telescopic transmission shaft 100, of a construction which is known per se, having universal joints at its opposite ends. Inside the gear box 98, the input shaft 99 is in driving connection, by way of co-operating bevel pinions, with a shaft 101 that extends substantially horizontally perpendicular to the direction A from both sides of the gear box 98 inside a protective tubular casing 102 that is fastened to the gear box 98 and to the frame beams 1. The opposite ends of the shaft 101 carry sprocket wheels 103 which drive sprocket wheels 106 and 107 fastened to the stub shafts 69 at the ends of the upper and lower drums 65, respectively, by way of corresponding transmission chains 94 and 95. It will be noted from FIG. 5 of the drawings that the sprocket wheels 106 and 107 are located at relatively opposite ends of the two drums 65. The stub shaft 69 at the end of the lower drum 65 that is remote from the sprocket wheel 106 carries a smaller sprocket wheel 108 which is linked by a transmission chain 109 to a sprocket wheel 110 at one end of the central rotary shaft of a pick-up assembly of the basically known pick-up mechanism 90 that has been referred to above. As will be evident from FIG. 1 of the drawings, the pick-up mechanism 90 is turnable upwardly and downwardly relative to the frame of the vehicle about a substantially horizontal axis coincident with the central axis of the lower drum 65, said mechanism 90 being provided with its own small ground wheels 91 so that its pick-up tines will maintain a substantially fixed level relative to the ground surface even when work on somewhat bumpy or undulating ground is being undertaken.

The stub shaft 69 at the end of the upper drum 65 that is remote from the sprocket wheel 107 carries a crank arm 111 whose free end is pivotally coupled to one end of a connecting rod 112 that extends downwardly and rearwardly therefrom with respect to the direction A at one side of the vehicle to a one-way pawl and ratchet mechanism 113 located near the rear end of one of the frame beams 1. It is not necessary to describe the pawl and ratchet mechanism 113 in detail but it will be evident from the drawings that rotation of the crank arm 111 will cause an arm of the mechanism 113 (FIG. 3) to oscillate about the axis of the shaft 61. This arm operates a pawl which co-operates with a ratchet wheel on the shaft 61 to rotate that shaft 61 relatively slowly in a step-by-step manner. The upper run of the endless conveyor 57 can thus be moved slowly rearwardly over the fixed floor of the chamber 4 in the direction indicated by an arrow in FIG. 1 of the drawings. The output of the mechanism 113 is also drivingly connected, by way of a chain 114, to a further chain transmission 113B that drives the upper shaft 21 of the endless conveyor 18 that is associated with the lower portion 14 of the rear wall 13 of the chamber 4. The endless conveyor 24 associates with the upper portion 15 of said rear wall 13 is driven from the shaft 21 by way of a chain transmission 115 (FIGS. 3 and 4) interconnecting the shafts 21 and 27 and a second chain transmission 116 interconnecting the shafts 27 and 28. These transmissions positively rotate the upper shaft 28.

Strong supporting lugs 112 depend from the two frame beams 1 immediately beneath the upright supporting beams 10 and it will be seen from FIG. 1 of the drawings that horizontally aligned pivots 113A turnably connect longitudinally extending axle beams 114A to the lugs 112A. Substantially horizontal axles at the leading rear ends of said beams 114a rotatably carry ground wheels 115A which are thus arranged in tandem relationship with a fore and aft pair at each lateral side of the vehicle.

In the use of the vehicle that has been described, the towing eye 105 or equivalent towing member at the leading end of the draw bar 94 is connected by a hitch pin or the like to a tow bar of the operating tractor or other vehicle. The auxiliary telescopic transmission shaft 100 is employed to place the rotary input shaft 99 of the gear box 98 in driven connection with the power take-off shaft of the same tractor or other vehicle and the vehicle which has been described can then be drawn over the ground in the direction A. As previously mentioned, the hydraulic system of the vehicle will also have been coupled to the hydraulic system of the tractor or other operating vehicle. The basically known pick-up mechanism 90 has a rotary tined drum which rotates in the direction indicated by an arrow in FIG. 1 of the drawings and picks up any cut crop, such as hay or the like, which it may encounter lying on the ground. This crop is guided upwardly and rearwardly with respect to the direction A beneath the curved bars 93 and towards the rotating drums 65 of the feeding or pushing mechanism 63. It will be remembered from the description above, and from FIG. 6 of the drawings, that the tines 85 of the drums 65 project from those drums to a maximum extent in the region of closest proximity of the drums to one another whereas they are completely withdrawn into the interiors of the drums in the regions of the latter that are furthest remote from one another. Thus, the crop that is delivered to the drums 65 by the pick-up mechanism 90 is engaged by the tines 85 of said drums 65 and is moved by those tines 85 through the narrow gap between the drums into a front region of the chamber 4 that accommodates the leading end of the upper run of the endless conveyor 57. This conveyor 57 is driven as previously described and forms a transport mechanism which slowly but progressively moves the collected crop rearwardly over the floor of the chamber 4 towards the rear wall 13 of that chamber. When collected crop reaches the rear end of the upper run of the conveyor 57, it is engaged by the conveyor 18 and, subsequently, by the conveyor 24. The crop is thus displaced upwardly along the interior surface of the rear wall 13 and onwardly along the tiltable portion 38 of the top 11 of the chamber 4. As the chamber 4 is progressively filled, its contents are rolled and formed gradually into a homogeneous entangled coherent mass. This, it will be realised, is in contradistinction to known vehicles for picking-up or otherwise collecting crop and like materials since such known vehicles generally fill their crop-receiving chambers with crop or the like that is only minimally entangled so that, upon discharge from the chamber, it falls to the ground in a more or less loose heap. Subsequent conveyance to a barn or other store is necessary to protect the crop from rain and other natural moisture. With a vehicle in accordance with the present invention, a load of crop can be discharged in a form in which it will substantially retain the configuration which it had within the chamber 4 and can be left lying on the ground with a good degree of resistance to rain and other natural moisture because of its compact nature which is maintained by the entanglement of the crop of which it is composed.

When a full load of crop is to be discharged from the chamber 4 of the vehicle, the vehicle is first towed to an appropriate discharge site after which the piston rods of the hydraulic piston and cylinder assemblies 36 are extended to turn the portions 14 and 15 relative to one another, and about the axis of the shaft 16, downwardly into substantially the position of the wall 13 that is shown in broken lines in FIG. 1 of the drawings. It will be noted that the upper portion 15 of the rear wall 13 carries a foot 117 which will engage the ground surface when said rear wall 13 is downwardly displaced to its unloading position. At this time, the rockers 34 bear against stops 118 carried by the lower substantially triangular plates 32. After the rear wall 13 has been brought to substantially the position thereof that is shown in broken lines in FIG. 1 of the drawings, the piston rods of the hydraulic piston and cylinder assemblies 45 are extended to bring the tiltable portion 38 of the chamber top 11 to the position thereof that is shown in broken lines in FIG. 1. The bell-crank levers or rockers 43 are first caused to turn the hooks or latches 51 upwardly about their pivotal mountings in anticlockwise directions as seen in FIG. 1 of the drawings thus disengaging them from the retaining pins 53 whereafter said levers or rockers 43 will engage the alternative stops 47 and will tilt the portion 38 of the top 11 upwardly about the axis of the shaft 40 into substantially the position thereof that is shown in broken lines in FIG. 1. The three endless conveyors 57, 18 and 24 are then all driven to cause the contents of the chamber 4 to move downwardly along the inclined floor of the chamber and over the rear wall 13 which is then disposed in downward and rearward prolongation of said floor. The inclined disposition of the floor of the chamber 4 when the vehicle is connected to an operating tractor or other vehicle facilitates circulation in the chamber 4 during the collection of crop and also facilitates unloading of the collected crop in a compact mass. The mass is deposited on the ground in the form of a coherent compact stack whose top is rounded and slightly peaked owing to the configuration of the chamber top 11. The tines 54 that are provided on the tiltable portion 38 of the top 11 have a combing effect upon the crop, and particularly upon the last quantities of crop to pass those tines, so that the crop stems located in at least an upper region of the deposited stack are orientated into the general direction of movement of the crop past the tines 54 thus improving the natural rainwater drainage or shedding of the stack.

FIGS. 12 and 13 of the drawings illustrate an alternative embodiment in which the tines 54 are replaced by triangular plates 119 that are punched integrally from sheet metal. The plates 119 act in similar way to the tines 54 in combing or otherwise guiding at least the final quantities of each load of crop in such a way that the stems facilitate the drainage or shedding of rainwater and other moisture from each completed stack.

FIGS. 14 and 15 of the drawings illustrate a construction which is very similar to that already described with reference to FIGS. 1 to 8 of the drawings except that an alternative pick-up mechanism 90 and an alternative feeding or pushing mechanism are employed. In the construction shown in FIGS. 14 and 15 of the drawings, the basically known pick-up mechanism 90 feeds crop or other like material which it collects to an upwardly orientated channel or passage 120. The channel or passage 120 opens into the chamber 4 in a front region thereof with respect to the intended direction of operative travel A (FIG. 14), and the endless conveyor 57, whose upper run is arranged to move forwardly with respect to the direction A as indicated by an arrow in FIG. 14, pushes introduced crop forwardly into the reach of conveying means provided in association with the front wall of the chamber 4. The conveying means which has just been mentioned comprises a plurality of generally upright elongate tine supports 121 whose upper ends are pivotally mounted and whose lower ends are connected by bearings to the crank pins of a crank shaft 122. The tine supports 121 are of telescopic construction and each of them carries a plurality of vertically spaced apart barbed tines 123. The tines 123 can project through corresponding slots 124 formed for each of the regularly spaced apart telescopic supports 121 across the width of the front wall of the chamber 4 and, upon rotating the crank shaft 122 by drive derived from the gear box 98, the tines 123 perform a motion which is partially rotary around the axis of revolution of the crank shaft 122 and partially reciprocatory with respect to the pivotally mounted upper ends of the supports 121. During operation, when the tines 123 are projecting through the slots 124 into the chamber 4, they are moving upwardly along the front wall thereof whereas, when they are withdrawn forwardly from the chamber through the slots 124, they are moving downwardly. The collected crop is thus caused to move through a more or less circular rolling path in the chamber 4 but in an opposite direction (indicated by an arrow in FIG. 14) to the direction in the case of the embodiment of FIGS. 1 to 8 of the drawings. The conveyors 18 and 24 are not provided in this embodiment and the tines 54 or plates 119 are appropriately repositioned. When the chamber 4 is to be unloaded, only the endless conveyor 57 is employed, its direction of movement being reversed by using a gear box that is not illustrated.

Although certain features of the vehicles that have been described will be set forth in the following claims as inventive features, it is emphasised that the invention is not necessarily limited to those features and that it includes within its scope each of the parts of each vehicle that has been described and/or illustrated in the accompanying drawings both individually and in various combinations.

What we claim is:

1. A crop collection vehicle comprising a frame movable over the ground and pick up means at the forward side of the vehicle, said vehicle having front and rear walls each of which has a substantially curved configuration and said walls adjoining a top thereby defining an enclosed crop receiving chamber, a load receiving floor supported on said frame and an entrance leading into said chamber being located adjacent and to the rear of said pick up means, said pick up means comprising a forward pick up device that picks up crop from the ground and a feeding device that receives crop from said pick up device and urges crop through said entrance into said chamber, a conveyor system in said chamber to move crop along the said curved walls and top during operation, said feeding device comprising two cooperating drums and driving means on said vehicle connected to rotate said drums in relative opposite directions, each of said drums having tines that are movable to active crop loading positions and said entrance being located in said front wall, adjacent said drums.

2. A vehicle as claimed in claim 1, wherein the diameters of the paths traced by the tips of the tines of said two drums during rotation thereof are substantially equal to one another whereas lengthwise of said horizontal axes, the paths described by the tips of the tines of said two drums overlap one another during rotation.

3. A vehicle as claimed in claim 1, wherein the tines of each drum are mounted on supports that are rotatable relative to the corresponding axis of rotation of that drum and each drum comprises an outer sheath within which said tine supports are rotatable about further axes that are parallel to the corresponding axis of rotation of that drum, said sheath having surface slots and said tines being movable through said slots to active positions.

4. A vehicle as claimed in claim 3, wherein said tine supports are elongated and rotatable about further axes located adjacent the periphery of their corresponding drum, said tines being mounted on separate bushes having retaining means that prevent them from turning relative to their corresponding supports.

5. A vehicle as claimed in claim 4, wherein each drum has four tine supports that are spaced apart from one another by angles of about 90° around the corresponding drum axis and each drum is mounted on a central shaft with a drive transmission connecting said shaft and each corresponding tine support to said driving means, said drive transmission comprising intermediate idler pinions in mesh with pinions secured to said tine supports and with a drive pinion on said central shaft.

6. A crop collection vehicle comprising a frame movable over the ground and pick up means at the forward side of the vehicle, said vehicle having front and rear walls and each wall having a substantially curved configuration, said walls adjoining a top and defining a receiving chamber with curved surfaces, said chamber including a load receiving floor that is supported on said frame and an entrance leading into said chamber, said entrance being located adjacent and to the rear of said pick up means, a conveyor system positioned at least partly within said chamber and said system including at least one conveyor that extends upwardly and adjacent the curved rear wall, said conveyor being associated with said rear wall and positioned to receive crop and move same along the interior surfaces of said rear wall, top and front walls during the operation of said conveyor system, said rear wall having a tiltable portion that is displaceably connected to said frame with hinge means and movable to a downwardly tilted position with respect to said chamber, said conveyor being supported on said tiltable portion and movable with that portion into an unloading position for conveying the crop mass out of said chamber.

7. A vehicle as claimed in claim 6, wherein said top of the chamber, as seen in side elevation, is substantially semicircular in configuration with an upwardly directed substantially central bulge that extends lengthwise in a direction substantially parallel to the normal direction of travel of said vehicle, said bulge being of maximum magnitude in the uppermost region of said top.

8. A vehicle as claimed in claim 6, wherein said top, front and rear walls are connected with side walls which extend substantially parallel to the normal direction of travel of said vehicle, said side walls being bulged outwardly to define an enlarged chamber.

9. A crop collection vehicle comprising a frame movable over the ground and a crop receiving chamber supported on said frame, a conveyor system positioned at least partly within said chamber to move crop and unload same, said chamber having a floor and further being defined by walls including a front wall and a rear wall, both of which have a substantially curved configuration, said front and rear walls adjoining a top of said chamber, said conveyor system being positioned to roll crops in a mass along the interior surfaces of said walls and top within said chamber during the operation of said conveyor system, said rear wall having a tiltable portion that is displaceably connected to said frame with hinge means and movable to a downwardly tilted unloading position with respect to said chamber, in which at least one conveyor of said system is positioned to move the crop mass out of said chamber and said tiltable portion affording a guide for the crop being unloaded.

10. A vehicle as claimed in claim 9, wherein said tiltable portion is pivoted to the frame and turnable about a substantially horizontal axis.

11. A vehicle as claimed in claim 9, wherein the entire rear wall is movable to a downwardly tilted unloading position, said one conveyor coextending with said rear wall throughout the latter's length.

12. A vehicle as claimed in claim 9, wherein a portion of said top is positioned above said rear wall and pivotably connected to said frame, said top portion being turnable upwardly about a pivot axis located adjacent the uppermost region of said top to a crop discharge position, said pivot axis being substantially horizontal and substantially parallel to an axis about which the tiltable portion of said rear wall is tiltable.

13. A vehicle as claimed in claim 9, wherein said rear wall is comprised by two parts and each part has a respective conveyor said two parts being pivoted to one another and being substantially equal in length.

14. A vehicle as claimed in claim 9, wherein said conveyor system includes at least one endless floor conveyor and said floor conveyor extends downwardly from said front wall to said rear wall.

15. A vehicle as claimed in claim 9, wherein said conveyor system includes a plurality of reciprocatory conveying members located adjacent a front entrance of said chamber and driving means on said frame is connected to said conveying members.

16. A vehicle as claimed in claim 15, wherein said reciprocatory conveying members comprise elongate tine-carrying supports connected to a crank shaft of said driving means.

17. A vehicle as claimed in claim 9, wherein a floor conveyor of said conveyor system adjoins said one conveyor and crop is movable from said floor conveyor to the one conveyor and then upwardly along the rear wall, said floor conveyor being comprised of at least one endless conveyor.

18. A vehicle as claimed in claim 9, wherein said conveyor system extends across substantially the entire width of said chamber.

19. A vehicle as claimed in claim 9, wherein a mechanism for picking up crop is connected to said frame at the front thereof and said mechanism includes a pick up device and a feeding device, said feeding device being located adjacent said pick up device and comprising two co-operating drums that are connected to driving means on said frame and rotatable in opposite directions, each drum having tines that are movable to active crop loading positions.

20. A crop collection vehicle comprising a frame movable over the ground and a receiving chamber having front and rear walls each of which has a substantially curved configuration and said walls adjoining a top, a crop receiving floor supported on said frame, pick up means mounted adjacent said front wall to move crop into said chamber, a conveyor system within said chamber being positioned to move said crop along the inner surfaces of said front and rear walls during operation as a rolled mass, driving means connected to said pick up means and to conveyors of said system to operate same, orienting means on said vehicle positioned within said chamber and adjacent at least one of said walls to orient the stems of crop during the latter's movement along said walls, said rear wall having a tiltable portion that is displaceably connected to said frame with hinge means and movable to a downwardly tilted unloading position with respect to said chamber for conveying the crop mass out of said chamber by means of said conveyor system.

21. A vehicle as claimed in claim 20, wherein said orientating means comprises a plurality of tine-shaped elements that are inclined inwardly away from said one wall in a direction of movement of crop, said elements being arranged in a row that extends substantially perpendicular to the direction of movement of the crop, said elements being arranged adjacent said top and said rear wall.

22. A vehicle as claimed in claim 20, wherein said orienting means comprises substantially triangular plates made of sheet material.

23. A vehicle as claimed in claim 20, wherein pairs of ground wheels are connected to said frame to support said frame beneath the approximate center of said chamber, said ground wheels being mounted to pivot about a substantially horizontal axis relative to said frame and including a pair of ground wheels at each lateral side of said vehicle, the ground wheels of each pair being positioned in fore and aft tandem relationship.

24. A method of collecting crop and loading same for transport within an enlarged enclosed load receiving chamber comprising circulating said crop along the inner surfaces of walls and top of the chamber and passing the crop by projecting combing elements located adjacent the path of movement of the crop to contact and at least partly orient the crop stems in the general direction of movement past said elements, progressively forming a rolled mass of crop in a coherent stack within said chamber and thereafter discharging said mass as a single stack from said chamber.

25. A method as claimed in claim 24, wherein said crop is circulated intermittently and conveyed first downwardly and then upwardly along a rear wall of said chamber.

* * * * *